United States Patent
Mytych et al.

(10) Patent No.: US 11,734,369 B2
(45) Date of Patent: Aug. 22, 2023

(54) PROCESSING COMPLEX DATA RECORDS

(71) Applicant: AMADEUS S.A.S., Biot (FR)

(72) Inventors: Francois-Joseph Mytych, Le Rouret (FR); Delphine Viviane Dupont, Valbonne (FR); Clement Paul Jean-Baptiste Trescases, Antibes (FR); Florian Hennion, Tourrettes sur Loup (FR)

(73) Assignee: Amadeus S.A.S., Biot (FR)

( * ) Notice: Subject to any disclaimer, the term of this patent is extended or adjusted under 35 U.S.C. 154(b) by 256 days.

(21) Appl. No.: 17/075,914

(22) Filed: Oct. 21, 2020

(65) Prior Publication Data

US 2022/0121717 A1 Apr. 21, 2022

(51) Int. Cl.
G06F 16/9535 (2019.01)
G06F 16/951 (2019.01)
G06Q 30/0601 (2023.01)
G06Q 50/14 (2012.01)
G06F 16/2455 (2019.01)
H04L 45/12 (2022.01)

(52) U.S. Cl.
CPC ...... G06F 16/9535 (2019.01); G06F 16/2455 (2019.01); G06F 16/951 (2019.01); G06Q 30/0627 (2013.01); G06Q 30/0631 (2013.01); G06Q 50/14 (2013.01); H04L 45/124 (2013.01)

(58) Field of Classification Search
CPC ............. G06F 16/9535; G06F 16/2455; G06F 16/951; G06Q 30/0627; G06Q 30/0631; G06Q 50/14; H04L 45/124
See application file for complete search history.

(56) References Cited

U.S. PATENT DOCUMENTS

| | | | |
|---|---|---|---|
| 11,378,925 B2 * | 7/2022 | Lundy | G05B 11/01 |
| 2002/0122410 A1 * | 9/2002 | Kulikov | H04L 45/28 |
| | | | 370/349 |
| 2012/0087377 A1 | 4/2012 | Lai | |
| 2015/0169772 A1 * | 6/2015 | Alonso | G06Q 30/0269 |
| | | | 707/728 |
| 2017/0147583 A1 | 5/2017 | Buchmann | |
| 2017/0161178 A1 * | 6/2017 | Raghavan | G06F 11/3684 |
| 2017/0230191 A1 * | 8/2017 | Cuzzort | H04L 67/01 |
| 2019/0108192 A1 * | 4/2019 | Kirshenboim | G06F 16/29 |
| 2019/0238446 A1 * | 8/2019 | Barzik | G06F 3/061 |

(Continued)

OTHER PUBLICATIONS

European Patent Office, Extended European Search Report and Opinion issued in European patent application No. 20306251.8 dated Apr. 1, 2021, 7 pages.

*Primary Examiner* — Alford W Kindred
*Assistant Examiner* — Tiffany Thuy Bui
(74) *Attorney, Agent, or Firm* — Thompson Hine LLP

(57) ABSTRACT

Methods, servers, and computer programs for processing multiple data records in response to a database request with search indications are provided. The server retrieves multiple data records with parameter values in the fields which correspond to the search indications indicated by the database request, determines weight values for at least two of the fields based on the corresponding parameter values of the at least two fields, calculates an aggregated score for at least a number of the retrieved data records based on the determined weight values, and returns at least a subset of the retrieved data records to the client based on the calculated aggregated scores.

15 Claims, 10 Drawing Sheets

(56) References Cited

U.S. PATENT DOCUMENTS

| | | | |
|---|---|---|---|
| 2019/0303459 A1* | 10/2019 | Yan | G06F 16/35 |
| 2022/0075786 A1* | 3/2022 | Aymard | G06F 16/24564 |
| 2022/0286213 A1* | 9/2022 | Krajnc | H04B 17/318 |
| 2022/0286482 A1* | 9/2022 | Barday | H04L 63/04 |

* cited by examiner

| leg number | Origin | Destination |
|---|---|---|
| 1 | Europe | N. America |
| 2 | Europe | S. Africa |
| 3 | Europe | India |
| 4 | Europe | Russia |
| 5 | S. Africa | S. America |
| 6 | S. Africa | Australia |
| 7 | N. America | M. America |
| 8 | M. America | S. America |
| 9 | India | Australia |
| 10 | Russia | Japan |
| 11 | Japan | Australia |

FIG. 5

| Network Parameter | Bandwidth in GB/s | Bit error ratio in % | Connection type | Latency in s | Provider | Throughput in Mbps | Transmission time per MB in s |
|---|---|---|---|---|---|---|---|
| Parameter values / ranges | 0.5 - 5 | 0.001 – 10 | {WAN, Wireless, Sat.} | 0.001 - 1 | {A,B,C} | 10 | 0.1 - 10 |
| Weight value determination by | Linear Function | Inverse Function | Discrete Values | Inverse Function | Discrete Values | Linear Function | Inverse Function |

Weight value associations

| Connection type | |
|---|---|
| WAN | 50 |
| Wireless | 30 |
| Satellite | 10 |

FIG. 6

| Leg number | Parameter 1 | Parameter 2 | Parameter 3 | Parameter 4 | Score |
|---|---|---|---|---|---|
| 2 | Latency 1/0.1 | Bandwidth 1*2 | Connection Type 10 | Throughput 2/3*2 | 23.3 |
| 3 | Latency 1/0.2 | Bandwidth 0.5*2 | Connection Type 50 | Throughput 4/3*2 | 58.6 |
| 4 | Latency 1/0.1 | Bandwidth 2*2 | Connection Type 50 | Bit rate 3/3*2 | 66 |
| 6 | Latency 1/0.5 | Transmission time 10/3 | Connection Type 10 | Throughput 6/3*2 | 19.3 |
| 9 | Latency 1/0.3 | Bandwidth 2*2 | Connection Type 10 | Throughput 5/3*2 | 20.6 |
| 10 | Bit error ratio $10^{-10}/10^{-10}$ | Transmission time 10/223.3 | Connection Type 30 | Bit rate 4/3*2 | 38.6 |
| 11 | Bit error ratio $10^{-10}/7^{-10}$ | Bandwidth 0.5*2 | Connection Type 50 | Throughput 3/3*2 | 53 |

FIG. 7

| OfferID | Cabin | Rebookability | Bag | Score for return trip | Price |
|---|---|---|---|---|---|
| abdc | ECONOMY [40] | NOT ALLOWED [0] | NOT INCLUDED [0] | 80 | $430 |
| agfe | ECONOMY [40] | NOT ALLOWED [0] | INCLUDED [20] | 120 | $480 |
| ahfd | PREMIUM [60] | WITH PENALTY [20] | NOT INCLUDED [0] | 160 | $550 |
| akut | PREMIUM [60] | WITH PENALTY [20] | INCLUDED [20] | 200 | $590 |
| amec | BUSINESS [120] | WITH PENALTY [20] | INCLUDED [20] | 320 | $850 |
| arte | BUSINESS [120] | ALLOWED [40] | INCLUDED [20] | 360 | $890 |
| azur | FIRST CLASS [200] | ALLOWED [40] | INCLUDED [20] | 520 | $1450 |

FIG. 9

PROCESSING COMPLEX DATA RECORDS

TECHNICAL FIELD

This disclosure generally relates to processing data records on a server. More specifically, the disclosure relates to retrieving data records in response to a database request, processing the retrieved data records, and returning a number of the processed data records.

BACKGROUND

Technology companies often handle a significant amount of data to provide services such as search engines or big data platforms. To ensure an adequate quality of service in terms of response times, the server capacities are arranged in a specific manner, so that the data flow is handled as efficiently as possible and the performance of the system is stable and predictable. Optimizations are employed at the level of the hardware as well as at the level of processing flows and protocols, the latter ones being often arranged to minimize data traffic and data retrieval overhead.

Furthermore, the performance of these services depends on well-structured database tables in order to render the processing of retrieval requests efficient. Often, quality-of-service requirements require the retrieval and processing of the data records to be within specified time limits.

Hence, generally, there is a need for arrangements supporting efficient data collection, processing and return.

SUMMARY

According to a first aspect, a processing method for multiple data records by a server is provided. In response to receiving a database request with search indications, the server retrieves multiple data records comprising multiple fields with respective parameter values which correspond to the search indications indicated by the database request, determines weight values for at least two of the fields based on the corresponding parameter values of the at least two fields, calculates an aggregated score for at least a number of the retrieved data records based on the determined weight values, and returns at least a subset of the retrieved data records to the client based on the calculated aggregated scores.

In accordance with a second aspect, a server system for processing multiple data records in response to a database request with search indications is provided. The server is arranged to retrieve multiple data records with parameter values in the fields which correspond to the search indications indicated by the database request, determine weight values for at least two of the fields based on the corresponding parameter values of the at least two fields, calculate an aggregated score for at least a number of the retrieved data records based on the determined weight values, and return at least a subset of the retrieved data records to the client based on the calculated aggregated scores.

In accordance with a third aspect, a computer program is provided which makes one or more processors of a computer to execute the aforementioned method aspect when the computer program is run on the computer.

BRIEF DESCRIPTION OF THE DRAWINGS

Aspects and examples of the present disclosure are described with reference to the following figures, in which:

FIG. 5 relates a network routing example and shows examples of the methodologies used herein.

FIG. 6. shows examples for the network routing use case.

FIG. 7. is a table of an exemplary use case for the network routing.

FIG. 9 provides a weight value and score determination example for a booking engine use case.

DETAILED DESCRIPTION

Figure 1:
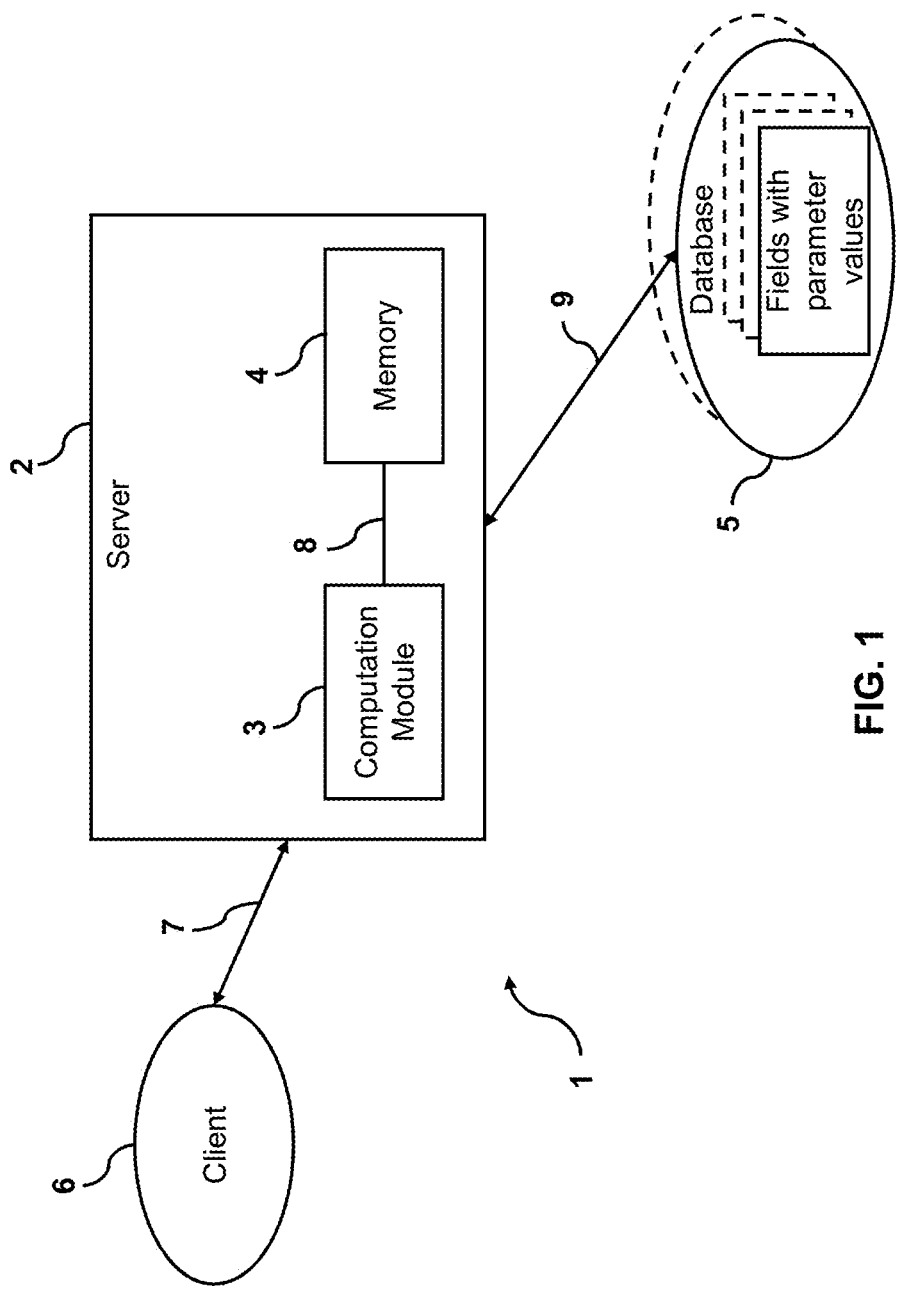
FIG. 1 shows a general structure of a database system described herein.

A common problem when handling so-called open database requests only specifying a small number of search parameters and/or broad ranges of search parameter values is a heterogeneity of data records in terms of data structure and content. This gives rise to a lack of compatibility and comparability among data records and their given parameter values. In these situations, a server such as a search platform may retrieve an enormous number of data records all of which fulfil the broadly defined search parameter values of a database request, but is expected to return only a limited number of data records in order to avoid overloading network and client processing capacities. In addition, data records may have to be retrieved from multiple different sources/databases with different database schemes so that the retrieved data records may therefore have different complex data structures such as multiple fields with values of different formats. Processing data records in order to decide which few of the greater number of data records are to be returned to a requesting client can be computationally complex and time-intensive.

It is therefore desirable to equip such server system with a processing mechanism that enables the server to process such heterogenous data records and answer the aforementioned database request in an efficient manner. The present disclosure tackles this technical problem by way of a specific normalization mechanism in order to render heterogeneous data records comparable and therefore processible in a more efficient manner. A high-level illustration of an architecture of such server system 1 is given by FIG. 1.

The server system 1 includes a server 2 which is arranged to receive database requests from a client 6. The database requests include search indications such as one or more search parameter values. In response to receiving such database request, the server 2 retrieves and processes data records from one or more databases 5 in order to return data records which are in accordance with the search indications of the database request.

In particular, as mentioned before, the retrieved data records may be large in number and heterogeneous in terms of data structures and/or in terms of parameter values. A decision is to be taken by the server 2 which subset of the retrieved data records fulfil the search parameter values best and are therefore to be returned to the client 6.

In order to facilitate efficient implementation of this decision, the server 2 utilizes weight values. The weight values are defined to indicate a quality of a parameter value of a data record in terms of fulfilling a search parameter value of the database request. For example, the server 2 stores or has access to stored tables of weight values which correspond to parameter values of the fields of data records and/or to rules or functions to compute weight values based on parameter values of the fields of retrieved data records. By utilizing such tables and/or rules/functions, the server 2 determines weight values for the parameter values in the fields of the retrieved data records.

These determined weight values are then combined to an aggregated score per data record. The aggregated scores normalize the data records and facilitate a comparison of the data records, e.g., by establishing a ranked order of the data records given by their aggregated scores. Higher aggregated scores may indicate that respective data records constitute a better match to the search indications indicated in the database request than lower aggregated scores. Hence, such data records with higher scores may be returned to the client 6, while data records with lower aggregated scores are filtered/discarded by the server 2.

As shown by FIG. 1, the server 2 includes a computation module 3 for executing software code and/or routines implementing the functionalities of the server 2 described herein as well as a memory 4 for buffering and processing retrieved data records. The memory 4 serves as a storage space for intermediate data utilized by the method activities/functionalities such as buffering data requests from the client 6, data records retrieved from the databases and the weight values. The memory 4 may also store the weight values and/or rules/functions to compute the weight values as well as the determined aggregated scores. The memory 4 is internally connected via an interface 8 (such as a bus interface) to the computation module 3.

The server 2 is communicatively coupled to the client(s) 6 via a communication interface 7. The clients are arranged to send database requests and receive corresponding responses from the server 2 over the interface 7. In some embodiments, the interface 7 utilizes wide area networks including the Internet and/or mobile communications networks according to 2G/3G/4G/5G standards and/or a WiFi/WLAN network according to IEEE specifications.

Furthermore, the server 2 has one or more communication interfaces 9 to at least one database 5 with multiple data records stored in the databases. In some embodiments, the databases 5 are co-located with the server 2, e.g., in a common local area network or at the same machine or server farm. In these embodiments, the interface 9 is a local network or machine-internal connection. In other embodiments, at least some of the databases 5 are located remote from the server 2 (cf. the use case discussed below with respect to FIG. 4), i.e., the interface 9 employs wide-area connections e.g., including the Internet.

The one or more databases 5 contain data records with a defined data structure specified by the respective database schemes of the databases 5. Generally, the data structure of the data records includes a number of fields, wherein each field includes one value or multiple values (such as a value range) of a given parameter. The databases may be relational databases operating being managed according to database management languages such as SQL (Structured Query Language). The server 2 is thus arranged to retrieve data records from such databases by way of SQL statements (e.g., SELECT . . . FROM . . . ). One or more of the databases 5 may also be non-relational databases (NoSQL databases), so that the server 2 is equipped with the corresponding functionality to access these databases.

To retrieve data records from the databases 5 in accordance with the search indications (search parameter values) indicated in the database request received from the client 6, the server 2 transmits a retrieval request to at least one of the databases 5. The retrieval request indicates at least a part of the search parameter values of the database request. The database 5 responds with the corresponding data records having parameter values in the fields that are in line with the search parameter values.

After having processed the data records retrieved from the one or more databases 5 (as will be described in more detail below), the server 2 returns one or more of the processed data records to the client 6 over the communication interface 7, thereby providing a response to the database request. The client 6 may then further process the returned data records and, depending on the particular use case, e.g., submit follow-up database requests to the server 2.

Figure 2:
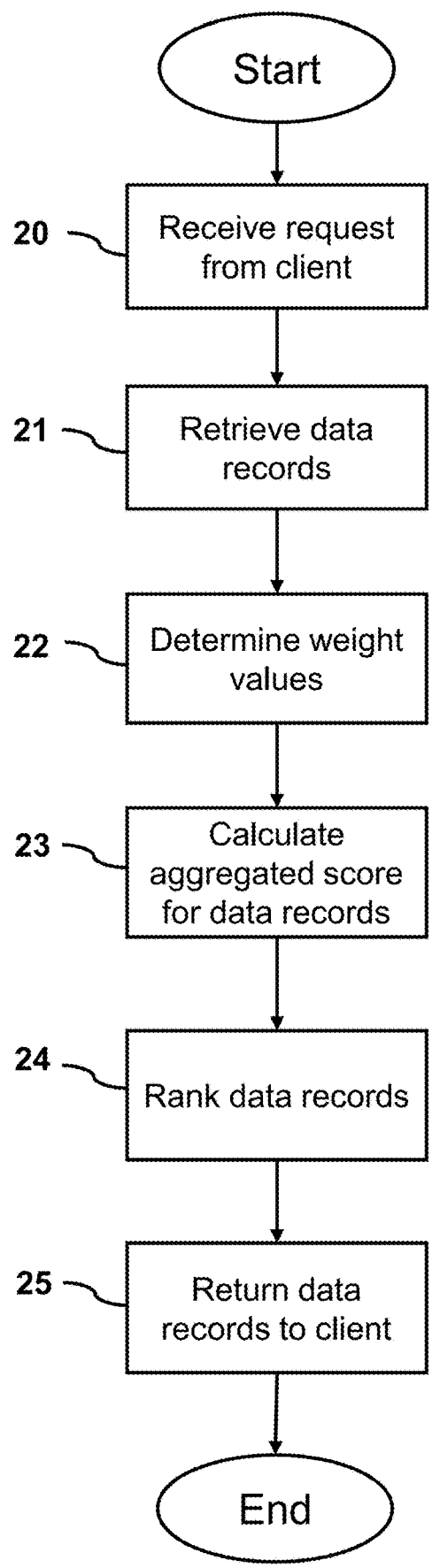
FIG. 2 is a flow chart of the method activities at a more general level of abstraction.

At a general level of abstraction, the server 2 operates according to the flow diagram of FIG. 2. Accordingly, first, at 20, the server 2 receives the database request with search indications from the client 6. As already described above, the database request includes the search parameter values defining e.g., ranges or thresholds which the parameter values in the fields of data records to be returned to the client 6 should meet. Reception of the database request triggers the processing sequence of the following activities at the server 2.

Next, at 21, the server 2 retrieves data records from the one or more databases 5 by way of a retrieval request sent to the databases 5. For example, the server 2 translates the database request from the client 6 to respective syntaxes of the databases 5 or, if the syntax of the database request from the client 6 and the syntax of a database 5 is the same, forwards the database request from the client 6 to the database 5. The databases 5 answer the retrieval request by returning corresponding database records fulfilling the search parameter values of the database request of the client 6. The server 2 then buffers the received data records in the memory 4 for further processing.

Afterwards, at 22, the server 2 determines weight values for the parameter values in the fields of the retrieved data records. In some embodiments, at least some of the parameter values are given weight values, e.g., parameter values in those fields for which a corresponding search parameter has been indicated in the database request of the client 6. In other embodiments, all parameter values of the retrieved data records are assigned with respective weight values in order to further promote comparability of the retrieved data records.

Specific implementations of the weight value determination may depend on the value space of the parameters. For example, parameters may exist with a small value space of only a few discrete values (e.g., in the order of five or ten values). These parameters are allocated with one weight value of discrete weight values, i.e., the values of these parameters are assigned with fixed given weight values based on a one-to-one relation between a parameter value and a corresponding weight value. These one-to-one relations for a given parameter may be stored in the form of a table in the memory 4. On the other hand, there may be parameters which have continuous values and/or value ranges (for example, the value space of a certain parameter may span from 0 to 1000 with three digits of decimal places) and therefore a large number of potential parameter values. In order to assign weight values to parameter values of such parameters, mathematical functions such as linear, non-linear, reverse, exponential functions and others may be employed which define an algorithmic way to determine the weight value for a particular parameter value. Implementation examples of the weight value determination are set out further below with reference to FIG. 5.

In the next activity, at 23, the determined weight values are used to calculate aggregated scores, one aggregated score per data record. Generally, an aggregation function or operation is employed to combine the weight values of the parameter values of a data record to an aggregated figure. For example, in some embodiments, the weight values of a data record are summed and the resulting sum constitutes the aggregated score of the data record. Other functions such as averages or more complex functions may be employed. More specific examples are given further below.

Afterwards, in the next activity 24, the data records may be ranked according to their calculated aggregated score. Data records with higher aggregated scores are ranked higher than data records with lower aggregated scores. Ranking may facilitate a determination of a subset of the data records with the highest aggregated score which is to be returned to the client 6 at 25. Ranking may also be skipped, e.g., in embodiments where the determination of the subset is computationally simple, for example if one data record with the highest aggregated score is to be returned to the client 6.

Lastly, at 25, processing the database request is completed by returning data records to the client 6. For example, a given number of data records with the highest aggregated scores are returned to the client 6 as they are deemed to constitute the best match of the search parameter values indicated in the database request. In this way, data records with lower aggregated score values are filtered by the server 2 and not returned to the client 6. This facilitates a load reduction on the communication interface 7 between the server 2 and the client 6, as a relatively small number of data records which fulfil the search parameter values indicated in the request needs to be returned to the client 6.

In some optional embodiments, the database request includes weight indications in addition to the search parameter values, for at least some of the fields of the data records, and determining the weight values for at least two of the fields and/or calculating the aggregated score is based on the weight indications. In this way, the client 6 may prescribe weighting the parameter values of the requested data records at a certain level of generalization. The weight indications in the request may have a smaller granularity than the weight values determined by the server 2. For example, the weight indications may have three levels such as <high>, <medium>, <low>, indicating to the server 2 which parameters of the requested data records should be given a greater representation in the aggregated score (=higher weight value) than others. The server 2 may utilize the weight indications indicated in the database request to additionally weight the determined weight values when computing the aggregated scores. For example, the server 2 may calculate the aggregated scores on the basis of a weighted average function, wherein the weight values are weighted with the weight indications prescribed by the client 6.

In some embodiments, retrieving the multiple data records comprises retrieving the data records from a plurality of databases having dissimilar database schemes. Hence, in these embodiments, the data records retrieved from at least two databases 5 having different database schemes will have different data structures. For example, a first data record retrieved from a first database may define a particular parameter (e.g., for which a search indication has been present in the database record) by way of a single field, while a second data record retrieved from a second database may define the parameter by two fields. In other situations, the same parameter may be represented by different parameter values in different dimensions (e.g., data records of a first database may indicate a temperature in degree Celsius, while data records of a second database specify the temperature in degree Fahrenheit). Also the data formats of the parameter values may vary, e.g., a first parameter value may be defined by an absolute range from A to B by data records from a first database, while a second corresponding parameter value may be given by a start value A+ and a relative range indication. The present methodologies of determining weight values and aggregated scores serve to normalize data records of different data structures and data formats, and render dissimilar data records retrieved from multiple databases with different database schemes comparable in a computational efficient manner.

Figure 3:
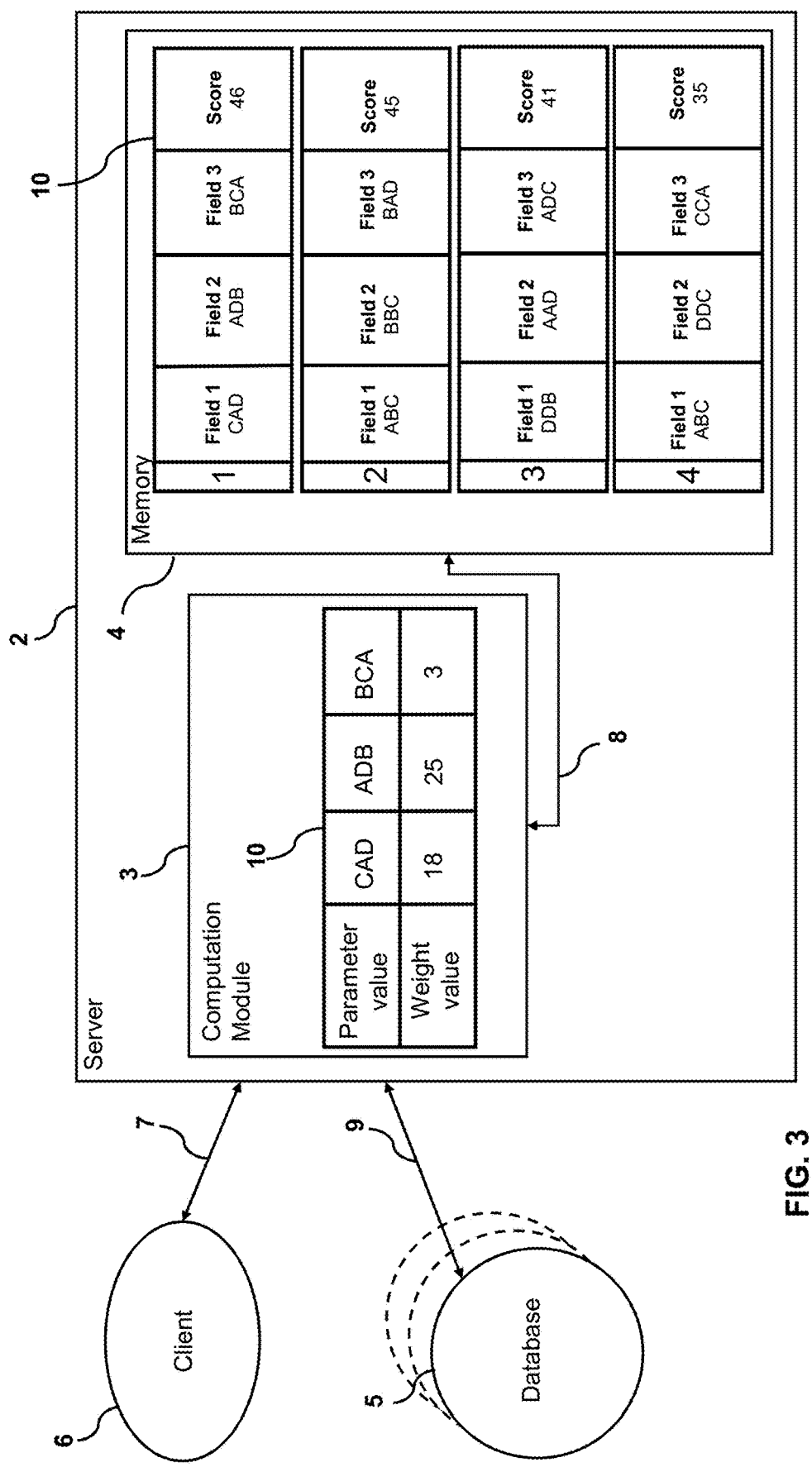
FIG. 3 shows the finer level of abstraction of the method activities.

FIG. 3 depicts a simplified pseudo-example of retrieved data records with calculated aggregated scores. In this example, four aggregated scores 10 are computed for four data records, respectively containing three fields with corresponding parameter values (visualized by pseudo-values using concatenated capital letters). The computation module 3 of the server 2 determines weight values for each of the parameter values in the three fields of the data records. FIG. 3 visualizes this determination for the first of the four data records. The computation module 3 then calculates the aggregated score e.g., by summing the three individual weight values (18+25+3=46). FIG. 3 also visualizes the ranking of the data records in accordance with their aggregated scores. As the first data record (CAD, ADB, BCA) has the highest score (46), the first data record may be returned to the client 6, while the other three data records with lower score may be discarded by the server 2, although their parameter values meet the search parameter values indicated in the database request as well.

The present methodologies may be utilized for a number of use cases. In some uses cases, the database request for data records is a routing request to determine a network route between network nodes in one or more communication networks. In these embodiments, client 6 seeks a network route from an origin network node to a destination network node of the network nodes, both of which are indicated in the routing request. In these embodiments, processing routing requests in accordance with the methodologies described above promotes an efficient network route selection.

Figure 4:
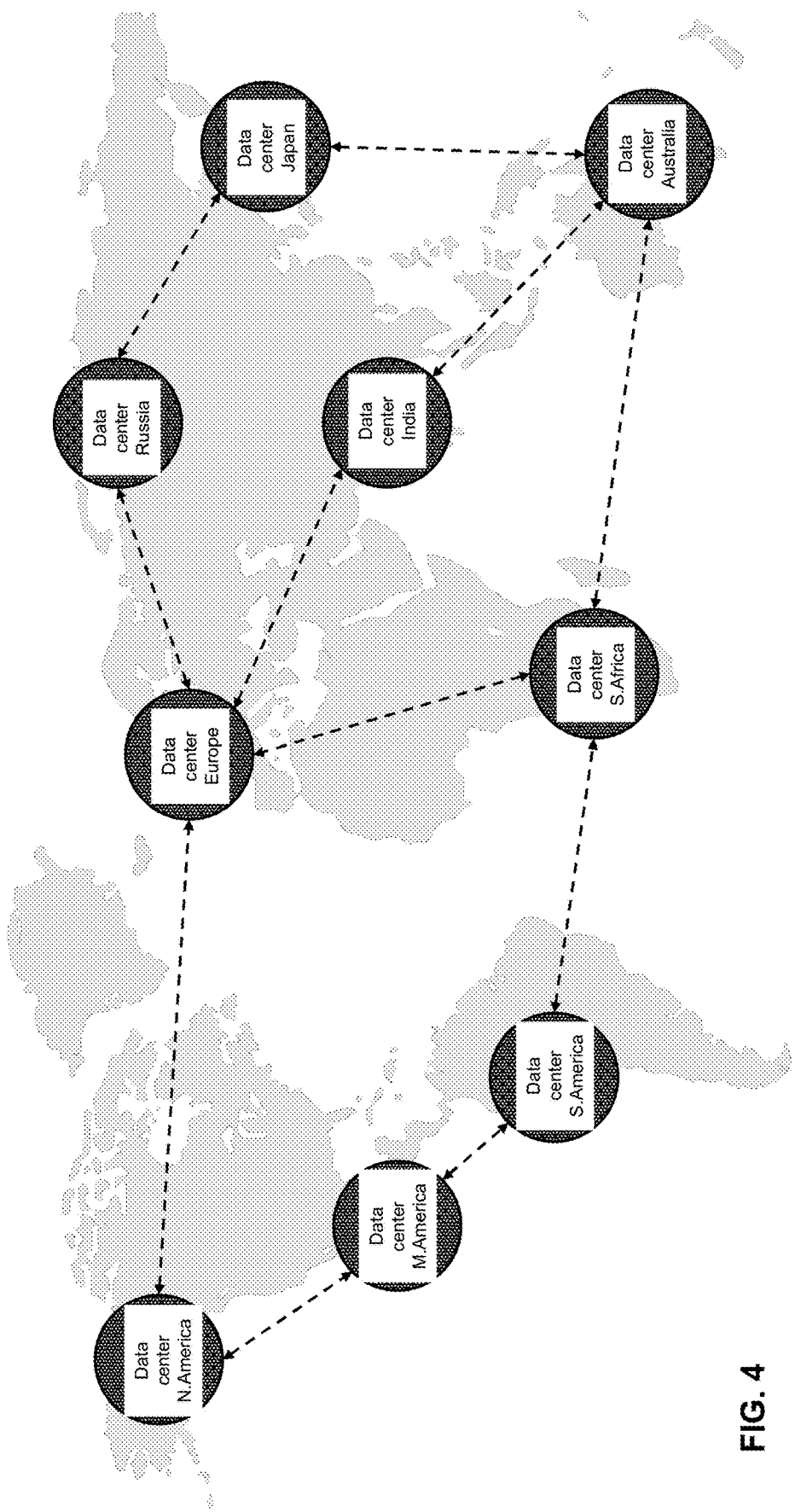
FIG. 4 depicts an exemplary use case of the present disclosure for processing network routing requests.

This exemplary use case of the database request relating to network routing processing will now be described in more detail with reference to FIG. 4 and with additional reference to FIGS. 5, 6 and 7. For example, this use case refers to a database request for establishing a network route via a global communication network connecting a number of data centers. FIG. 4 shows a simplified example of such network with nine data centers in different parts of the world. The client 6 may be a backup server of a company which requests a network route to a particular data center in order to conduct an online backup of a significant amount of data such as several hundred or thousands of Gigabytes. The client 6 may also be one of the data centers itself which e.g., needs to store a (partial) copy of its own database at a second data center for reasons of redundancy.

For instance, the data center in Europe demands to mirror a specific part of its stored data in the data center located in Australia. Hence, the client 6 (=data center Europe) sends a routing request to the server 2 (which is, for example, co-located with or geographically close to the data center Europe) for transmitting the data to be backed up to the data center in Australia. This request indicates the origin and destination data center (Europe and Australia) as well as one or more additional search parameter values like a desired bandwidth, a preferred transmission time or any other network- or security-related parameter for the backup transmission such as an encryption standard for the data to be transferred to Australia.

The routing request is received and then processed by the server 2. To this end, the server 2 accesses one or more databases 5 storing network route data specifying the nodes of the network, the connections (legs) between pairs of nodes and corresponding technical data specifying a Quality-of-Service (QoS) offered for the legs. Exemplary legs definitions corresponding to the network examples of FIG. 4 are shown by the table in FIG. 5. The specification of the legs may also be bidirectional, i.e., origin and destination nodes of the table of FIG. 5 can be switched. The table of FIG. 5 will additionally include further columns (which may also be held in further tables) with technical data specifying multiple QoS dimensions such as network-related parameters mentioned above. Hence, in embodiments, the fields of the data records contain parameter values specifying network quality-of-service parameters for one or more legs of the network routes including at least one of a bit rate, a bit error rate, a throughput, free bandwidth, a latency and a time until completion of a transmission of an amount of data. In addition, legs between the network nodes may be served by multiple network providers so that each of the network providers may define its own table specifying provider-specific technical QoS data for the legs that are supported by the respective network provider.

The server 2 and/or the database 5 storing the network route data compiles a number of possible network routes from the origin data center to the destination data center based on the leg definition data of FIG. 5. For example, the server 2 relays the routing request of the client 6 to the database(s) 5 storing the table(s) of FIG. 5, and the database 5 selects legs which fulfil the technical QoS requirements specified by the client 6 in the routing request, compiles a number of network routes composed of the selected legs, and returns the routes to the server 2. In other embodiments, the server 2 retrieves the basic leg data (cf. example of FIG. 7) and determines the possible routes between origin and destination network node itself. In either way, a route between an origin and destination node of the network may be defined by an aggregated data record per route, the fields of which specify the technical QoS parameters of the route. For example, latency values of the individual legs of a network route may be summed, resulting in an aggregated latency value for the network route. The overall bandwidth of a network route may be given by the minimum bandwidth values among the legs constituting the network route. If a network route is composed of multiple legs of different connection types, a connection type composite value (e.g., WAN+Satellite) may be built for the overall network route. Alternatively, a route is given by a concatenation of its individual legs, i.e., by a set of data records, a data record per leg.

In the aforementioned example of a requested transmission from Europe to Australia, the possible network routes between the two data centers are given by:

Route over India: Leg 3-Leg 9
Route over S. Africa: Leg 2-Leg 6
Route over Russia: Leg 4-Leg 10-Leg 11

Determination of the one or more best routes (in terms of technical quality of service) utilizes the methodologies describe at a more general level above. The server 2 determines weight values for the network parameter values defining the various QoS dimensions of the network routes. Subsequently, the weight values of the network routes are aggregated to an aggregated score per network route and network routes are determined on the basis of their aggregated scores. Generally, the aggregated score of a network route indicates the QoS of the network route, so the server 2 may return one or more network routes with the highest aggregated score(s).

FIG. 6 shows exemplary associations of the network parameter values with weight values. Generally, parameter values representing a higher quality of service are assigned with higher weight values than parameter values representing a lower quality of service. The listed network parameters have different parameter values spaces or ranges, such as the bandwidth being specifiable by parameter values between 0.5 and 5 GB/s. Linear or non-linear functions may be employed to assign weight values to parameter values of these parameters, e.g., higher parameter values are given higher weight values. Other parameters like bit error ratio or latency, where higher parameter values indicate a worse QoS than smaller parameter values are assigned with weight values by inverse functions. Here, lower weight values are given to higher parameter values, whereas higher weight values are assigned to lower parameter values. Other parameters like provider and connection type have a smaller parameter value space of only e.g., three discrete parameter values. Hence, in view of the limited number of parameter values (e.g., connection types), each parameter value has a corresponding fixed weight value (cf. additional in-line table for the connection type parameter exemplarily shown by FIG. 6).

Based on these defined relations between parameter values and weight values, the server 2 makes a decision about the most preferred network route in term of technical QoS characteristics as follows. As mentioned before, the server 2 has retrieved the network leg data from the database(s) 5, e.g., the data records defining the legs 2, 3, 4, 6, 10 and 11 which form the possible routes between Europe and Australia (FIG. 7). Some of these data records may share the same data structure, e.g., as these legs are operated by the same network provider and are therefore retrieved from one of the databases 5. For example, as shown by FIG. 7, the two data records specifying the respective legs 2 and 3 from Europe to India and South Africa, respectively, include respective fields for the network parameters latency, bandwidth, connection type and throughput. The values of these parameters are different for both legs, specifying the different technical QoS characteristics of the legs. The data structure of further data records may be different, e.g., because the corresponding legs are operated by another provider and, thus, the server 2 retrieves these data records from a different database 5 (cf. the example of FIG. 8 discussed further below).

The weight value determination function calculates respective weight values for the parameter values in the fields of the data records (examples shown in FIG. 7 as well). To this end, the weight value determination function uses the respective mathematical assignment functions such as the linear (or inverse) functions discussed above with respect to FIG. 6, for example as for leg 2:

|  | Parameter value | Function | Weight value |
|---|---|---|---|
| Latency | 0.1 s | 1/x | 10 |
| Bandwidth | 1 GB/s | x * 2 | 2 |
| Connection Type | Satellite | Discrete value | 10 |
| Throughput | 2 Mbps | x/3 * 2 | 1.3 |

Likewise, the weight values are also computed for the data records of the further network legs (FIG. 7). Subsequently, the weight values are aggregated to a respective aggregated score for each of the data records (legs), for example by calculating a sum of the weight values. Summing up the achieved weighted values results in an aggregated score of 23.3 for this exemplary leg 2, as well as the further aggregated scores for the further legs as shown by FIG. 7.

In the example, the aggregated score for the two legs over India are 58.6 and 20.6, the scores for the legs over South Africa are 23.3 and 19.3, and the scores for the three legs over Russia and Japan are 66, 38.6 and 53, which are all listed in FIG. 7. The three overall network routes from Europe to Australia may then be scored at a superordinate level by again aggregating the aggregated scores of the legs to a superordinate aggregated score at the route level. For example, an average score of the respective legs of a network route constitutes the aggregated score for the network route:

Route over India: aggregated route score: 39.6
Route over S. Africa: aggregated route score: 21.3
Route over Russia: aggregated route score: 52.5

Hence, in this example, although the route over Russia is composed of three legs, while the other two routes over India and South Africa include two legs, the Russian route has received the best aggregated score due to its better technical QoS characteristics (e.g., best connection type between Europe and Russia on leg 4 and Japan and Australia on leg 11).

The server 2 then selects the route with the highest aggregated score (here: route over Russia) and returns this route to the client 6 as the response to the network routing request. Generally, the subset of the retrieved data records to be returned to the client 6 is given by a number of the retrieved data records with the highest aggregated scores, the number being one or more than one data record.

In some embodiments, the number of legs of a network route may additionally be defined to be QoS characteristic (number of hops) and be given an own weighting value and thus be reflected in the aggregated score of a route. In this way, a further additional comparison dimension is utilized to refine efficient determination of one or more best network routes.

In some embodiments, not all QoS parameters of a network leg or route as specified by the fields of the data records are associated with weight values, and therefore not reflected in the aggregated score. For example, as mentioned above, the client 6 may indicate that one or more QoS parameters are to be excluded from the weighting and scoring functionality by way of corresponding weighting indications included in the routing request (e.g., weighting indication <low>). The server 2 may then exclude such QoS parameters/fields from the weighting/scoring functionality or give these QoS parameters/fields relatively low weight values compared to other QoS parameters/fields.

Figure 8:
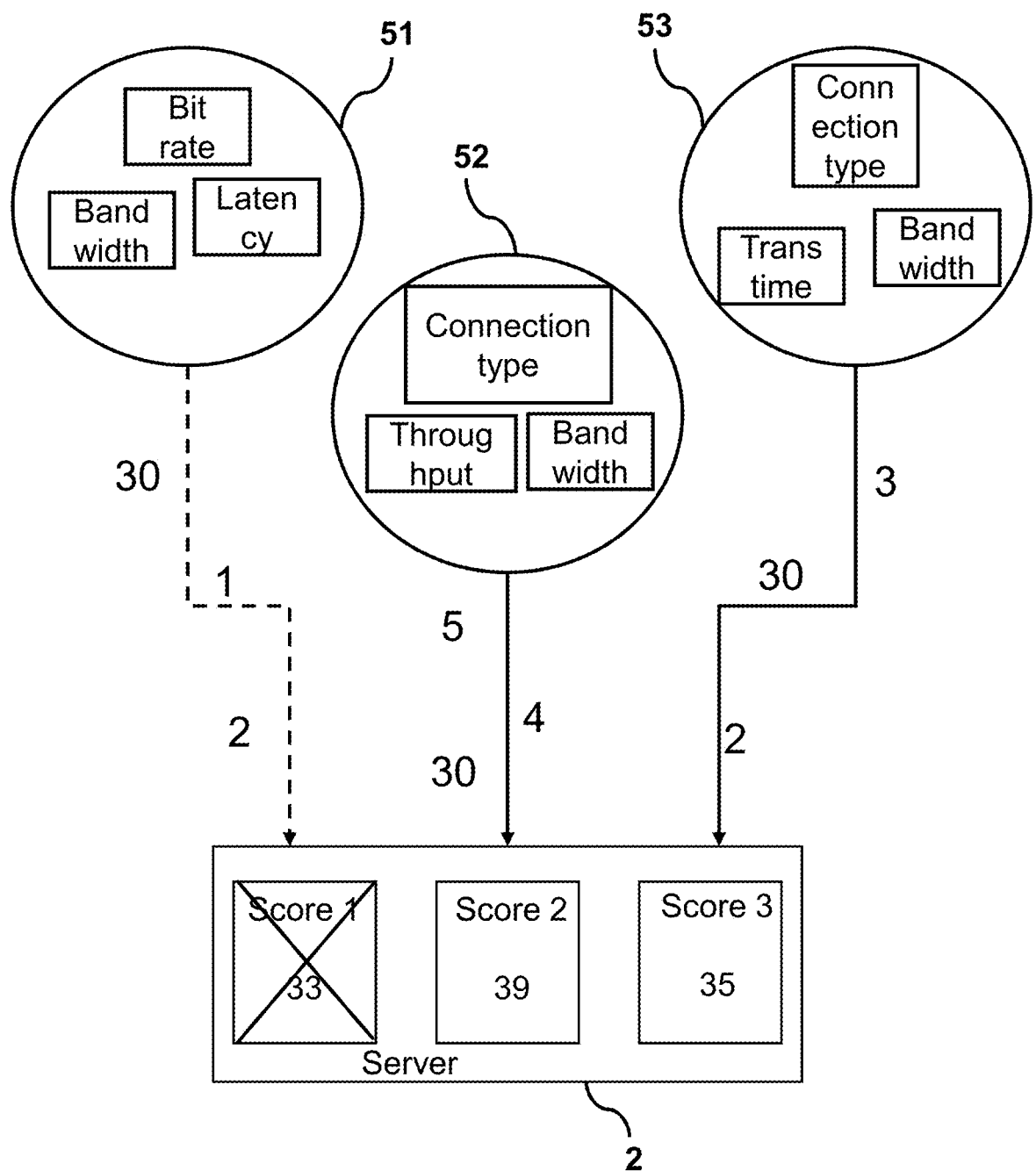
FIG. 8 shows example values for the aggregated score.

FIG. 8 shows a further example of processing a network routing request by the server 2. In this example, the legs of the communication network are operated by three network providers, each provider a database 51, 52, 53 which specifies the technical QoS parameters of the network leg. The first provider database 51 defines the legs operated by the first provider by way of bandwidth, the bit rate and the latency. The second provider database 52 specifies other QoS parameters such as the connection type in addition to the bandwidth and the throughput. Lastly, the third provider database 53 specifies the legs operated by the third provider by way of transmission time needed to transfer a predetermined amount of data, the connection type and the bandwidth.

The mechanisms of determining weight values and computing aggregated scores establish compatibility between these data records originating from databases with dissimilar data structure. For example, a client 6 asking for a route with a particular minimum bandwidth may be responded to with the network route having the best QoS characteristics. Although each of the three network providers may offer a route that suffices the bandwidth requirements of the client 6, the secondary QoS characteristics of the routes of the second network provider (connection type with weight value 5, throughput with weight value 4) and of the third network provider (connection type with weight value 3, transmission time with weight value 2) may be technically advantageous over the QoS characteristics of the network route of the first network provider (bit rate with weight value 1, latency with weight value 2). Accordingly, the server 2 may return the routes of the second and third network provider (having an aggregated score of 39 and 35, respectively) as a response to the network routing request (leaving the final selection between these two network route options to the client 6), while filtering the route of the first network provider (having an aggregated score of 33).

The present methodologies are also applicable to further use cases such as booking or reservation processes. For example, a booking engine arranged to process travel booking requests may determine weight values for travel characteristics such as a number of stops of a flight, a booking class, allowed baggage, as well as any other options of the travel, and compute an aggregated score per travel offer in order to determine a limited number of travel offers that fulfil the search parameters of the client 6 best.

In such booking engine embodiments, the booking engine (specific embodiment of server 2) receives a travel search request from the client 6. The client is, for example, a travel agency or a terminal device of an end user. The travel search request specifies one or more travel parameter values such as origin, destination, travel dates, booking classes, etc. In response to receiving the travel search request, the booking engine retrieves a plurality of data records defining offers from one or more travel providers such as airlines (if the travel is a flight) which fulfil the travel parameter values indicated in the travel search request. The booking engine then determines weight values for the data records defining the offers, namely for the parameter values in the fields of the data records, in accordance with the methodologies described above. The weight values and/or functions to compute the weight values may have been provided by the respective travel provider and are stored at a storage location accessible to the booking engine, such as a local database. The booking engine then proceeds to compute aggregated scores for the retrieved offer data records.

A non-limiting and simplified example of this use case is provided by FIG. 9. In response to a travel search request, the booking engine has retrieved seven travel offers from a travel database which fulfil travel search parameters indicated in the travel search request, such as a particular origin, a particular destination, and dates for an outbound flight and a return flight. The travel offers are identified by respective identifiers (OfferID) and specify a cabin class, to which extent the travel is re-bookable, and whether or not bags are inclusive. In practice, further parameters and corresponding values may be present.

After having retrieved the travel offers, the booking engine determines weight values for the parameter values in the fields of the data records. In the example of FIG. 9, the parameter values are associated with given weight values, e.g., the cabin class values Economy, Premium, Business and First Call are associated with respective weight values of 40, 60, 120 and 200. The weight values are indicated in square brackets in FIG. 9. Note that these weight values are schematic examples for the purpose of visualization. The booking engine then calculates respective aggregated score values for the travel offers. According to the simplified example of FIG. 9, the aggregated score of a travel offer is computed by the sum of the weight values of the fields multiplied by two (for outbound and return flight). In practice, more complex aggregation functions may be employed.

In the present use case of FIG. 9, the aggregated scores provide an indication of a quality of a travel offer and may therefore be used to further process the travel offers, such as calculating respective prices. To this end, the booking engine may employ a mapping, for example non-linear functions, to derive a price from an aggregated score. Compared to a traditionally complex fare computations, this may substantially simplify price calculation and render prices of travel offers of different quality more comparable and adequate.

The booking engine may then select a subset of the retrieved travel offers (which may include selecting all retrieved travel offers) and return the data records with the prices calculated on the basis of the aggregated scores to the client 6.

Figure 10:
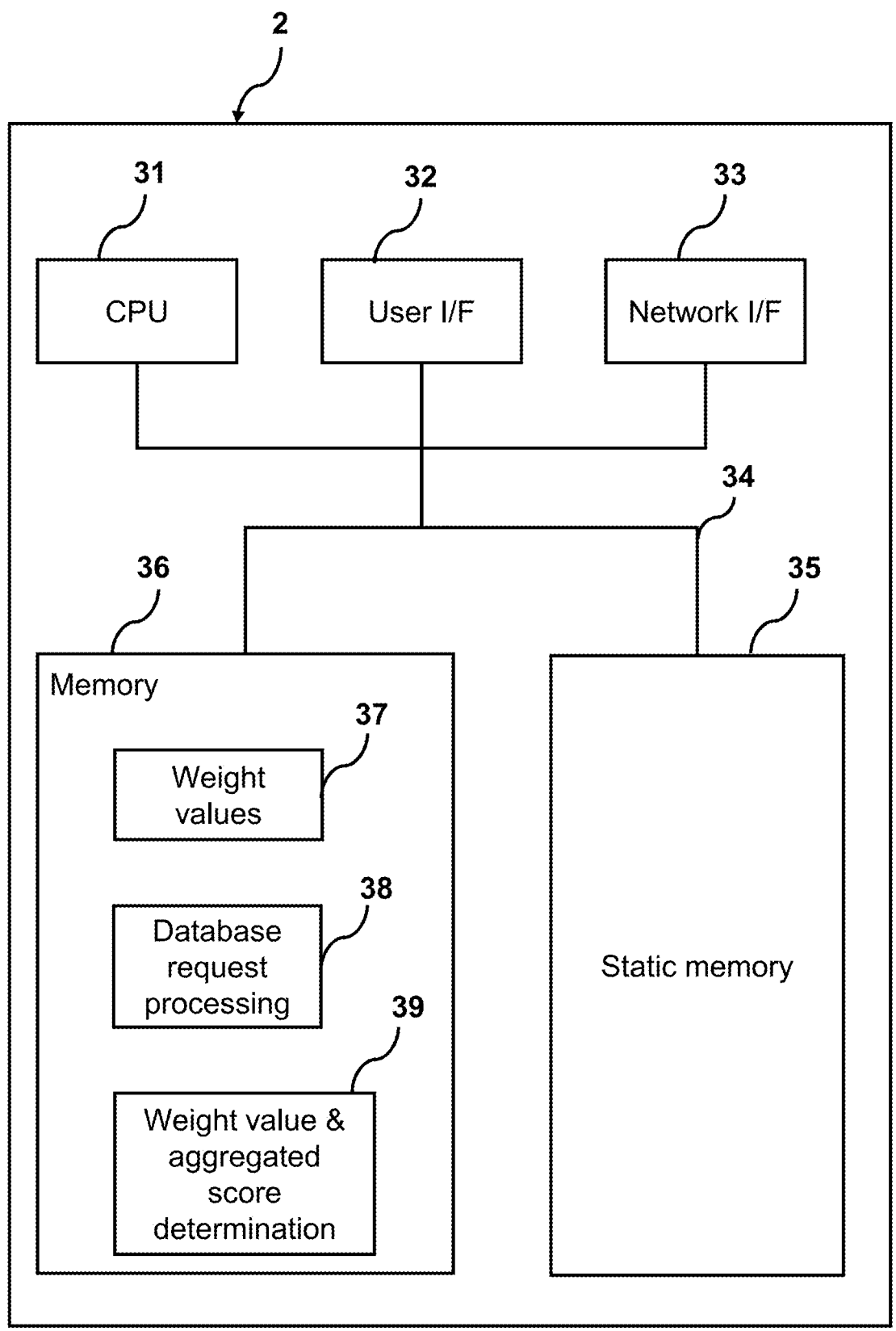
FIG. 10 shows an internal structure of the server.

FIG. 10 is a diagrammatic representation of the internal components of a server 2 implementing the functionality of the computation module 3. Similar servers may also realize one or more clients 6 in parallel described further above. The server 2 includes a set of instructions to cause the computing module 3 to perform any of the methodologies discussed herein when executed. The server 2 includes at least one processor 31, a main memory 36 and a network interface device 33 which communicate with each other via a bus 34. Optionally, the server may further include a static memory 35 and a disk-drive unit. A video display, an alpha-numeric input device and a cursor control device may be provided as examples of user interface 32. The network interface device 33 connects the server 2 including the computation module 3 to the other components of the server system 1 such as the client 6, the databases 5 and the memory 4 or any further components.

The computing module 3 includes a memory 36 such as main memory, random access memory (RAM) and/or any further volatile memory. The main memory 36 may store temporary program data to facilitate the functionality of the computation module 3. For example, the computation module 3 may maintain predefined weight values 37 which are fixed and/or retrieved from the client 6. The main memory 36 may also store computer program data 38 to implement the database request processing as explained above. The memory 36 may also temporarily store the weighting functions 39 constituting the initial transmitted weighting functions or a range of value allocations for the desired parameters during the processing of the computation module 3 and/or after results have been returned to the client 6, e.g., to keep the weighting functions readily available for potential follow-up requests such as the aforementioned network route selection message.

A set of computer-executable instructions (computer program code 38) embodying any one, or all, of the methodologies described herein, resides completely, or at least partially, in or on a machine-readable storage medium, e.g., the memory 36. For example, the instructions 38 may include software processes implementing the database request processing functionality of the computation module 3. The instructions 38 may also implement the functionality of receiving and responding to database requests from the client 6 and filter data records from the databases 5.

The instructions 38 may further be transmitted or received as a propagated signal via the Internet through the network interface device 33 or via the user interface 32. Communication within computing machine is performed via a bus 34. Basic operation of the computing machine 30 is controlled by an operating system which is also located in the memory 36, the at least one processor 31 and/or the static memory 35.

In general, the routines executed to implement the embodiments, whether implemented as part of an operating system or a specific application, component, program, object, module or sequence of instructions, or even a subset thereof, may be referred to herein as "computer program code" or simply "program code". Program code typically comprises computer-readable instructions that are resident at various times in various memory and storage devices in a computer and that, when read and executed by one or more processors in a computer, cause that computer to perform the operations necessary to execute operations and/or elements embodying the various aspects of the embodiments of the invention. Computer-readable program instructions for carrying out operations of the embodiments of the invention may be, for example, assembly language or either source code or object code written in any combination of one or more programming languages.

In certain alternative embodiments, the functions and/or acts specified in the flowcharts, sequence diagrams, and/or block diagrams may be re-ordered, processed serially, and/or processed concurrently without departing from the scope of the invention. Moreover, any of the flowcharts, sequence diagrams, and/or block diagrams may include more or fewer blocks than those illustrated consistent with embodiments of the invention.

The terminology used herein is for the purpose of describing particular embodiments only and is not intended to be limiting of the embodiments of the disclosure. It will be further understood that the terms "comprise" and/or "comprising," when used in this specification, specify the presence of stated features, integers, steps, operations, elements, and/or components, but do not preclude the presence or addition of one or more other features, integers, steps, operations, elements, components, and/or groups thereof. Furthermore, to the extent that the terms "includes", "having", "has", "with", "comprised of", or variants thereof are used in either the detailed description or the claims, such terms are intended to be inclusive in a manner similar to the term "comprising".

While a description of various embodiments has illustrated all of the inventions and while these embodiments have been described in considerable detail, it is not the intention of the applicants to restrict or in any way limit the scope of the appended claims to such detail. Additional advantages and modifications will readily appear to those skilled in the art. The invention in its broader aspects is therefore not limited to the specific details, representative apparatus and method, and illustrative examples shown and described. Accordingly, departures may be made from such details without departing from the spirit or scope of the applicant's general inventive concept.

What is claimed is:

1. A method comprising:
receiving, at a server from a client device, a database request for processing data records, the data records comprising multiple fields with respective parameter values, wherein the database request comprises a routing request for determining network routes from an origin node to a destination node in a communication network; and in response to the database request:
retrieving, at the server, multiple data records with parameter values in the fields which correspond to search indications indicated by the database request, wherein the multiple retrieved data records represent a plurality of network routes from the origin node to the destination node, and a number of network routes of the plurality of network routes are determined on the basis of aggregated scores of the network routes;
determining, at the server, weight values for at least two of the fields based on the corresponding parameter values of the at least two of the fields, wherein the fields contain parameter values specifying network quality-of-service parameters for one or more legs of the network routes including a bit rate, a bit error rate, a throughput, free bandwidth, a latency, or a time until completion of a transmission of an amount of data;
determining a preferred network route of the plurality of network routes based at least on one or more of the network quality-of-service parameters associated with the one or more legs of each of the network routes;
calculating, at the server, an aggregated score for at least a number of the multiple retrieved data records for the determined preferred network route and based on the determined weight values; and
returning at least a subset of the multiple retrieved data records with higher aggregated scores from the server to the client device and discarding data records with lower aggregated scores.

2. The method of claim 1, wherein the database request includes weight indications for at least some of the fields of the data records, and the weight values are determined for at least two of the fields and/or the aggregated score is calculated based on the weight indications.

3. The method of claim 1, wherein calculating the aggregated score comprises:
summing the weight values of the respective data record.

4. The method of claim 1, wherein the multiple data records are retrieved from a plurality of databases having dissimilar database schemes.

5. The method of claim 1, wherein parameter values representing a higher quality of service are assigned with higher weight values than parameter values representing a lower quality of service.

6. The method of claim 1, wherein the subset of the retrieved data records is given by a number of the retrieved data records with the highest aggregated scores.

7. The method of claim 1, wherein the server database request is a travel search request for priced travel recommendations, the multiple retrieved data records represent a plurality of travel recommendations in accordance with travel search parameters indicated by the travel search request, and further comprising:
calculating a respective price for the plurality of travel recommendations based on the respective aggregated scores.

8. A system comprising:
at least one processor; and
a computer-readable storage medium comprising a memory coupled to the at least one processor, the memory storing instructions that, when executed by the at least one processor, cause the system to:
receive, from a client device, a database request for processing data records, the data records comprising multiple fields with respective parameter values, wherein the database request comprises a routing request for determining network routes from an origin node to a destination node in a communication network; and
in response to the database request:
retrieve multiple data records with parameter values in the fields which correspond to search indications indicated by the database request, wherein the multiple retrieved data records represent a plurality of network routes from the origin node to the destination node, and a number of network routes of the plurality of network routes are determined on the basis of aggregated scores of the network routes;
determine weight values for at least two of the fields based on the corresponding parameter values of the at least two of the fields, wherein the fields contain parameter values specifying network quality-of-service parameters for one or more legs of the network routes including a bit rate, a bit error rate, a throughput, free bandwidth, a latency, or a time until completion of a transmission of an amount of data;
determine a preferred network route of the plurality of network routes based at least on one or more of the network quality-of-service parameters associated with the one or more legs of each of the network routes;
calculate an aggregated score for at least a number of the multiple retrieved data records for the determined preferred network route and based on the determined weight values; and
return at least a subset of the multiple retrieved data records with higher aggregated scores to the client device and discarding data records with lower aggregated scores.

9. The system of claim 8, wherein the database request includes weight indications for at least some of the fields of the data records, and the weight values are determined for at least two of the fields and/or the aggregated score is calculated based on the weight indications.

10. The system of claim 8, wherein the instructions that cause the system to calculate the aggregated score comprise:
summing the weight values of the respective data record.

11. The system of claim 8, wherein the multiple data records are retrieved from a plurality of databases having dissimilar database schemes.

12. The system of claim 8, wherein parameter values representing a higher quality of service are assigned with higher weight values than parameter values representing a lower quality of service.

13. The system of claim 8, wherein the subset of the retrieved data records is given by a number of the retrieved data records with the highest aggregated scores.

14. The system of claim 8, wherein the database request is a travel search request for priced travel recommendations, the multiple retrieved data records represent a plurality of travel recommendations in accordance with travel search parameters indicated by the travel search request, and the instructions further cause the system to:

calculate a respective price for the plurality of travel recommendations based on the respective aggregated scores.

15. A non-transitory computer-readable storage medium comprising instructions that upon execution by at least one processor cause the at least one processor to:

receive, from a client device, a database request for processing data records, the data records comprising multiple fields with respective parameter values, wherein the database request comprises a routing request for determining network routes from an origin node to a destination node in a communication network; and in response to the database request:

retrieve multiple data records with parameter values in the fields which correspond to search indications indicated by the database request, wherein the multiple retrieved data records represent a plurality of network routes from the origin node to the destination node, and a number of network routes of the plurality of network routes are determined on the basis of aggregated scores of the network routes;

determine weight values for at least two of the fields based on the corresponding parameter values of the at least two of the fields, wherein the fields contain parameter values specifying network quality-of-service parameters for one or more legs of the network routes including a bit rate, a bit error rate, a throughput, free bandwidth, a latency, or a time until completion of a transmission of an amount of data;

determine a preferred network route of the plurality of network routes based at least on one or more of the network quality-of-service parameters associated with the one or more legs of each of the network routes;

calculate an aggregated score for at least a number of the multiple retrieved data records for the determined preferred network route and based on the determined weight values; and return at least a subset of the multiple retrieved data records with higher aggregated scores to the client device and discarding data records with lower aggregated scores.

* * * * *

UNITED STATES PATENT AND TRADEMARK OFFICE
CERTIFICATE OF CORRECTION

| | | |
|---|---|---|
| PATENT NO. | : 11,734,369 B2 | Page 1 of 1 |
| APPLICATION NO. | : 17/075914 | |
| DATED | : August 22, 2023 | |
| INVENTOR(S) | : Francois-Joseph Mytych et al. | |

It is certified that error appears in the above-identified patent and that said Letters Patent is hereby corrected as shown below:

In the Claims

Column 13, Claim 7, Line 55 reads:
"7. The method of claim 1, wherein the server database"
It should read:
--7. The method of claim 1, wherein the database--

Signed and Sealed this
Nineteenth Day of September, 2023

Katherine Kelly Vidal
*Director of the United States Patent and Trademark Office*